(12) United States Patent
Penny et al.

(10) Patent No.: US 8,973,813 B2
(45) Date of Patent: Mar. 10, 2015

(54) SYSTEM FOR FACILITATING RETURN OF LOST PROPERTY

(76) Inventors: Nadine Wendy Penny, Minnetonka, MN (US); Todd Penny, Minnetonka, MN (US)

( * ) Notice: Subject to any disclaimer, the term of this patent is extended or adjusted under 35 U.S.C. 154(b) by 77 days.

(21) Appl. No.: 13/449,882

(22) Filed: Apr. 18, 2012

(65) Prior Publication Data

US 2012/0267430 A1 Oct. 25, 2012

Related U.S. Application Data

(60) Provisional application No. 61/477,043, filed on Apr. 19, 2011.

(51) Int. Cl.
*G06F 17/00* (2006.01)
*G06Q 10/08* (2012.01)

(52) U.S. Cl.
CPC .................................. *G06Q 10/08* (2013.01)
USPC .................................... 235/375; 235/385

(58) Field of Classification Search
USPC ................................................ 235/375, 385
See application file for complete search history.

(56) References Cited

U.S. PATENT DOCUMENTS

| 5,841,116 | A | * | 11/1998 | Lewis | 235/375 |
| 6,476,718 | B1 | | 11/2002 | Cartwright et al. | |
| 6,546,088 | B2 | * | 4/2003 | Campbell | 379/90.01 |
| 6,965,866 | B2 | * | 11/2005 | Klein | 705/302 |
| 7,424,473 | B2 | * | 9/2008 | Orton et al. | 1/1 |
| 7,626,505 | B2 | | 12/2009 | August et al. | |
| 7,898,414 | B2 | | 3/2011 | Spano | |
| 2007/0215685 | A1 | * | 9/2007 | Self et al. | 235/375 |
| 2008/0035722 | A1 | * | 2/2008 | Feld | 235/375 |
| 2009/0322530 | A1 | * | 12/2009 | Wagner | 340/572.1 |
| 2010/0223245 | A1 | * | 9/2010 | Vermilye | 707/706 |

* cited by examiner

*Primary Examiner* — Thien T Mai
*Assistant Examiner* — Toan Ly
(74) *Attorney, Agent, or Firm* — Patterson Thuente Pedersen, P.A.

(57) ABSTRACT

Systems and related methods for facilitating the return of lost, stolen or otherwise missing portable assets. Generally, a barcode or similar coding is generated and tagged to a specific portable asset such as, for example, an electronic device such as a smart phone or laptop computer or a piece of luggage such as a briefcase, purse, backpack or the like. A tag on the portable asset visually displays the barcode such that in the event the property is lost, a finder of the property can snap a picture of barcode with their smart device and automatically be directed to a webpage containing information that facilitates the return of the portable asset. When tagging the portable asset, an owner of the portable asset can control privacy levels with respect to information that ultimately becomes accessible to a subsequent finder of the portable asset.

26 Claims, 12 Drawing Sheets

*A Web Page* http://www.gokodes.com

Home > Finder

Thanks for scanning this GoKode

Thank-you, you have just taken the first step in returning this possession.

Please provide your contact details and a brief message and we will let the owner know you have found their IPAD.

They will get in touch with you shortly once they receive your message via GoKodes.

For your kind help, you will receive a free 6-month trial subscription for returning this IPAD).

MESSAGE TO THE FINDER — 216

You have just found JONNY'S IPAD TOUGH VERSION 2 serial number HG34623H234. Please send JONNY a message to confirm that their IPAD is safe so that they can get in touch and decide how to return it. — 218

JONNY has reported this IPAD lost and has posted a GOKODES notice and message "HEY I THINK I LEFT MY IPAD ON THE TRAIN THIS MORNING. THERE'S A $50 REWARD IF YOU HELP ME GET IT BACK" — 246

— 244

— 225

Your name:
Your email address:
Your phone:
Brief message:

○ Do you wish to share your name and details with the owner?
☑ public
☐ anonymous (we won't use your real name, email and phone)

*Powered by Pennell Group Accelerator*

— 252

SYSTEM FOR FACILITATING RETURN OF LOST PROPERTY

RELATED APPLICATION

The present application claims the benefit of U.S. Provisional Application No. 61/477,043 filed Apr. 19, 2011, and entitled, "SYSTEM FOR FACILITATING RETURN OF LOST PROPERTY", which is incorporated herein in its entirety by reference.

FIELD OF THE INVENTION

The present invention is directed to a system for facilitating the return of missing portable assets to an owner by way of a unique web page for the missing item. More specifically, the present invention is directed to the use of item specific codes, such as, for example, conventional barcodes and quick response codes that associate a lost portable asset with a unique web page having configurable and customizable return information specified by an owner based on the owner's individual privacy concerns. The system provides a mechanism for anonymous and secure communication between owners and finders of lost portable assets so to facilitate their return.

BACKGROUND OF THE INVENTION

As consumers accelerate their adoption of smart phones and similar mobile devices, one unfortunate consequence of these types of devices is the increasing frequency of these types of devices being misplaced or stolen. As such, it would be advantageous if people had a mechanism that used the power of these devices to help facilitate their return.

Traditional barcodes have been utilized for many years for tracking items during transit or for inventory purposes. For instance, airlines utilize barcodes during their check-in process to tag checked baggage to assist with tracking and verifying arrival at the final destination. Another representative example is the use of barcodes to track shipments from retailer to a consumer using various shipping companies, wherein the status and location of the shipment is updated to indicate the shipping progress. Finally, many companies utilize unique barcodes for high dollar items such as computers or other electronic devices so as to facilitate annual inventory and to track these assets.

More recently, a new style of coding technology referred to as a QR barcode or quick response barcode has begun to be utilized due to the increased amount of information that can be embedded within their code. For instance, individual internet addresses can be embedded within QR barcodes. Almost any individual with an electronic device having a camera such as, for example, "smart" phones, tablet computers, laptop computers and the like, can utilize readily available QR reader applications/programs to access a wealth of product information or be directed to websites including product information by simply snapping a picture of a QR barcode.

SUMMARY OF THE INVENTION

The present invention is directed to a system for facilitating the return of lost, stolen or otherwise missing portable assets. Generally, an barcode is generated and tagged to a specific portable asset such as, for example, corporate and personal property such as, for example, electronic devices including cell and smart phones, laptop or tablet computers, e-reader, gaming, music and GPS/mapping devices, items of luggage such as, for example, briefcases, purses, backpacks or daily use items such as, for example, wallets, checkbooks and keys/key rings. In some embodiments, the barcode comprises a QR barcode due to the large capacity offered by this format. A tag fixedly attached to the portable asset visually displays the barcode such that in the event the portable asset is lost, a finder of the portable asset can snap a picture of the barcode with their own smart device and automatically be directed to a webpage containing secure and potentially anonymous information regarding the portable asset.

In one aspect, a system of the present invention involves a vendor supplying barcodes, such as, for example, QR barcodes, that are uniquely associated with a designated portable asset. The vendor maintains a database and web presence allowing a user to log into a website whereby a barcode can be ordered or otherwise requested that will be associated with the portable asset. The barcode can be physically sent via conventional mail, or alternatively, sent electronically through a print function on the website or via email delivery. The user is able to establish account preferences related to the portable asset based on the privacy concerns and overall comfort of the user. For instance, the user can provide contact information such as phone numbers or email addresses directly on a unique webpage related to the portable asset. Alternatively, the webpage could include a more private or anonymous contact method such as, for example, allowing a finder of the portable asset to complete an email form where the destination email address of the owner is kept private. In addition, the owner of the portable asset may choose to post a reward message or return instructions when the portable asset is registered or as soon as the owner discovers that the portable asset is missing. Generally, a finder of the missing portable asset would be directed to the unique webpage for the portable asset by taking a photo of the barcode and using a suitable application/software to access a web address embedded within the barcode.

In another aspect, the present invention involves a method for facilitating the return of portable assets by encouraging direct communication between an owner of the portable asset and a finder of the portable asset. Generally, the method involves a third party vendor creating an online presence whereby a specific portable asset can be associated with a unique webpage that can include a variety of information facilitating the return of the portable asset to its owner. The owner initiates the method by requesting a barcode, for example, a QR barcode, that includes an embedded web address that is specific to the portable asset. The owner selects the type and amount of information displayed on the web page based on the comfort level of the owner with respect to privacy concerns. For instance, the owner can choose to display contact information such as, for example, phone numbers, email addresses or social network identities or alternatively, the owner can choose to provide a contact interface that allows the owner and/or the finder to remain anonymous. The owner then physically attaches the unique barcode to the portable asset. In the event that the portable asset is lost, a finder of the portable asset can utilize a camera equipped device to snap a picture of the barcode and utilize an appropriate application/software to be directed to the unique webpage for the portable asset. In some instance, the owner of the portable asset can choose to include reward information or other incentives on the webpage once it is discovered that the portable asset is missing or alternatively, this reward information can be posted during registration of the portable asset or at any subsequent time.

The above summary of the invention is not intended to describe each illustrated embodiment or every implementation of the present invention. The figures and the detailed description that follow more particularly exemplify these embodiments.

BRIEF DESCRIPTION OF THE FIGURES

The present invention is more completely understood in consideration of the following detailed description of various embodiments in connection with the accompanying drawings, in which.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE FIGURES

Figure 1:
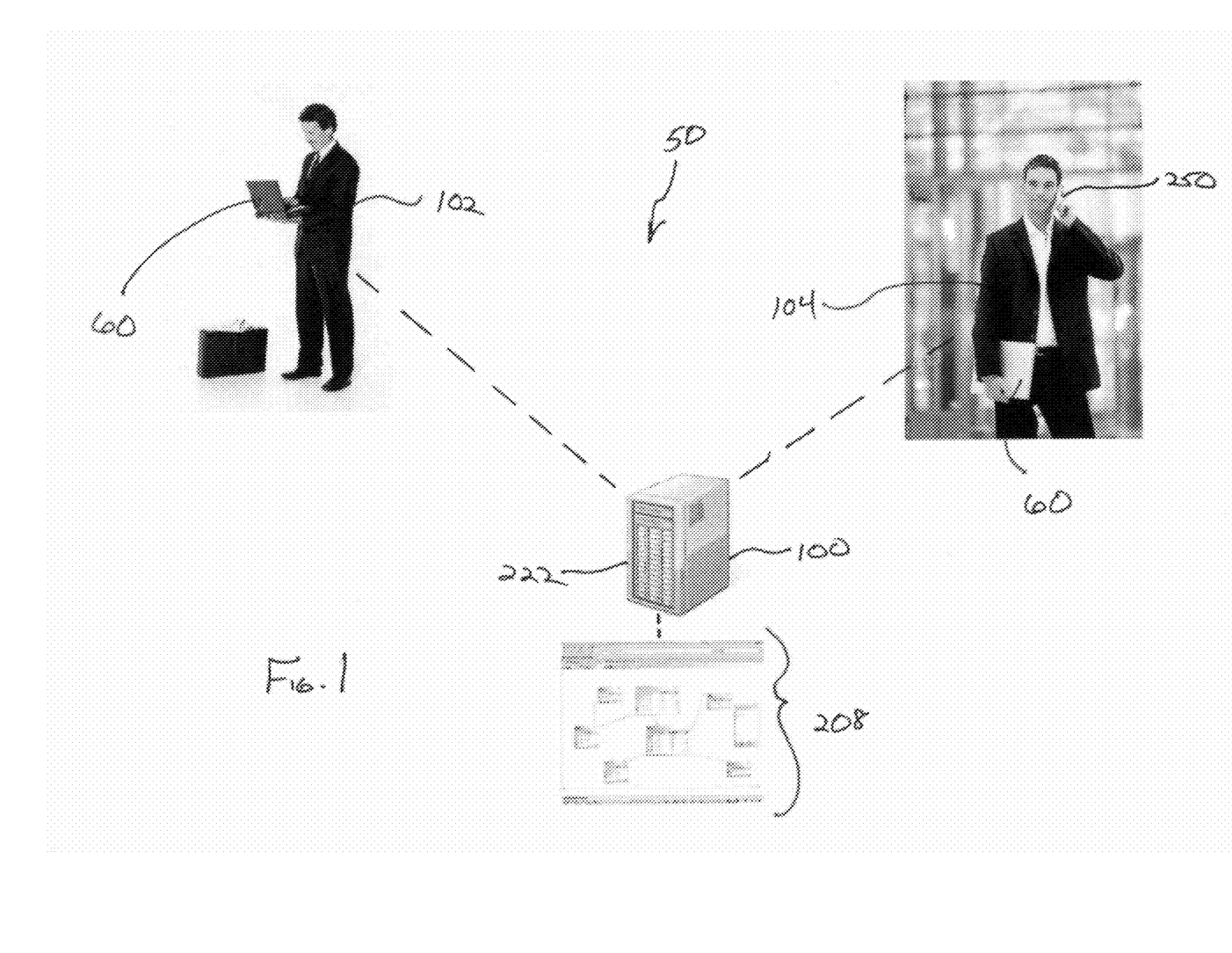
FIG. 1 is a schematic illustration of a system for returning missing portable assets according to an embodiment of the present invention.

As shown in FIG. 1, a system 50 for facilitating the return of lost, stolen or otherwise missing portable assets 60 generally comprises a centralized vendor 100, an owner of portable assets 102 and a finder of portable assets 104. Generally speaking, centralized vendor 100 provides necessary infrastructure to facilitate direct interaction between the owner of portable assets 102 and the finder of portable assets 104. Centralized vendor 100 preferably does not actively participate in the return of portable asset 60 but instead provides a mechanism for the owner of portable asset 102 and finder of portable asset 104 to communicate with their desired level of comfort and privacy.

Figure 2:
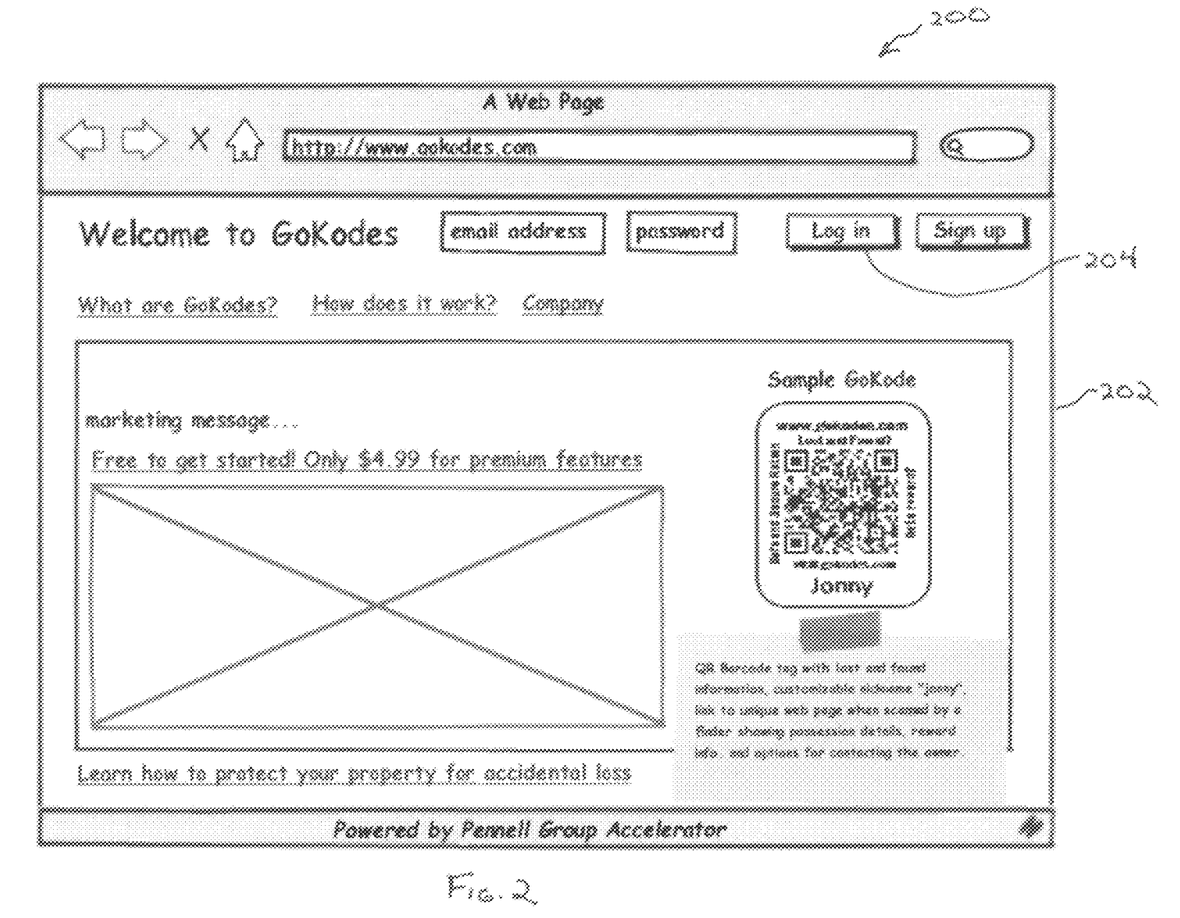
FIG. 2 is an illustration of a computer screenshot of a web page interface for use with the system of FIG. 1.
Figure 3:
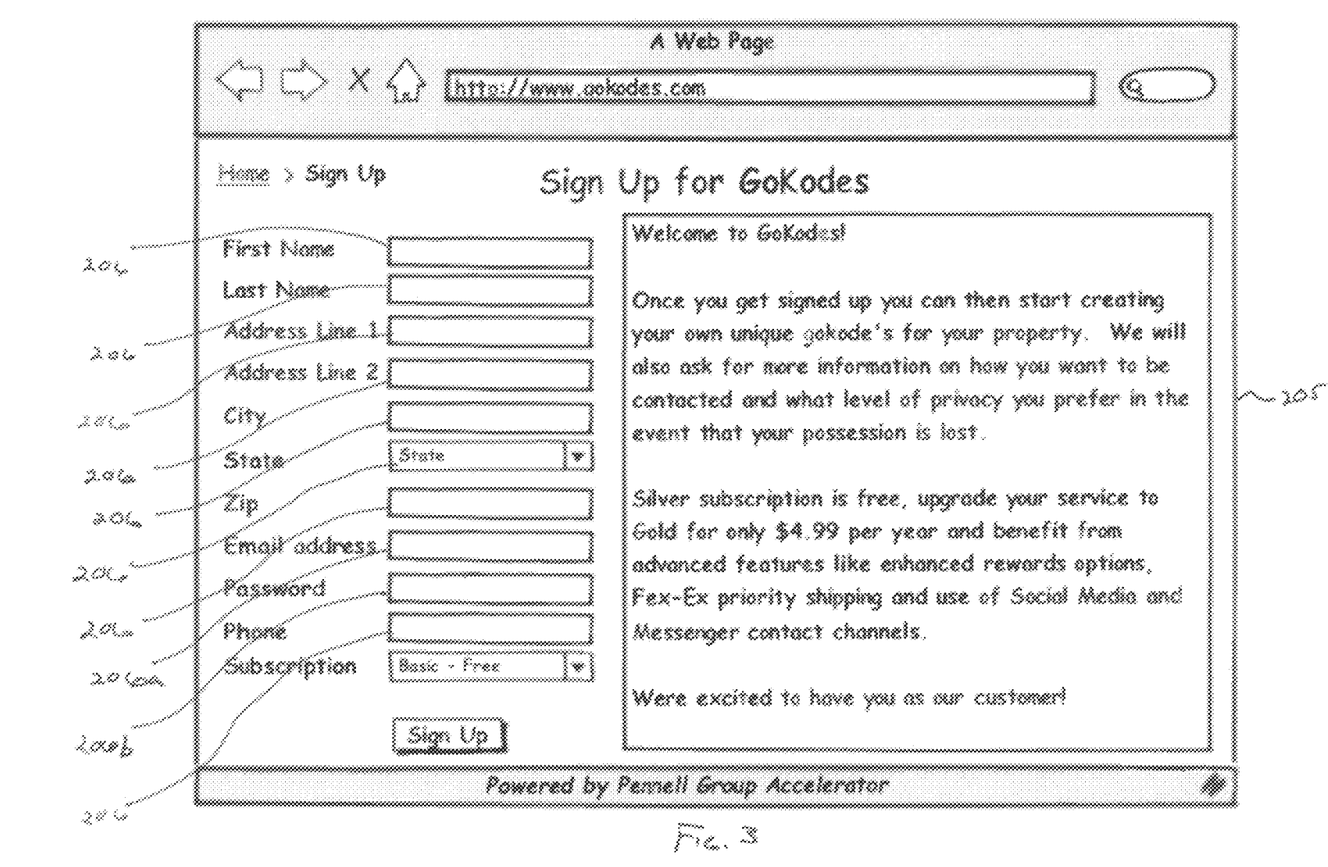
FIG. 3 is an illustration of a computer screenshot of an individual account sign-up page interface for use with the system of FIG. 1.
Figure 4:
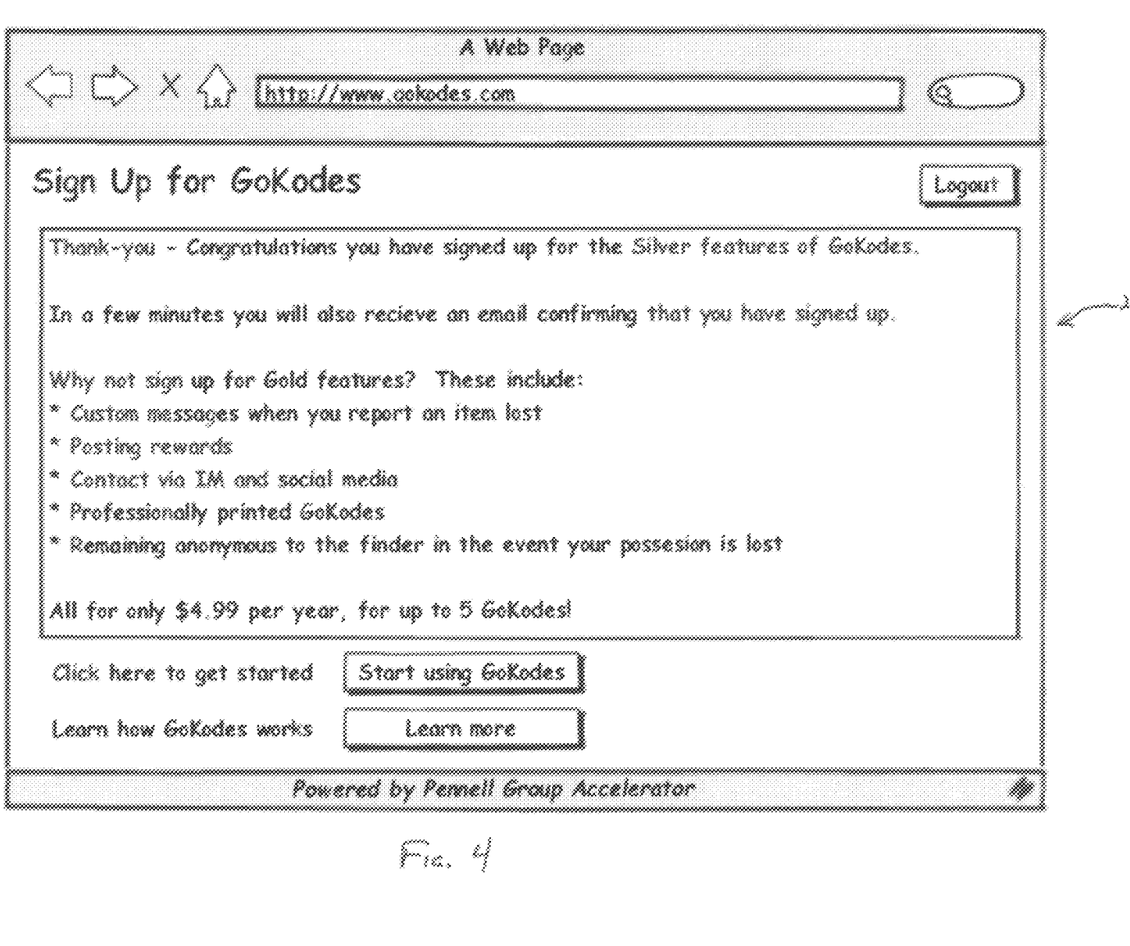
FIG. 4 is an illustration of a computer screenshot of a sign-up confirmation page interface for use with the system of FIG. 1.

Centralized vendor 100 generally creates and maintains an online presence 200 that is easily accessible via the internet as illustrated in FIG. 2. Online presence 200 generally comprises a web page interface 202 allowing owners 102 to create and access individual accounts 204. By creating and then logging into an individual account sign-up page 205, an owner 102 can recite a variety of personal information 206 as shown in FIG. 3 that is unique to owner 102 and that is maintained in a secure vendor database 208. Personal information 206 can include any of a variety of information that allows owner 102 to be recognized and to facilitate communication related to the return of portable asset 60, billing or other related functions. Personal information 206 can include information including legal names, contact information including mailing and email addresses, twitter account, instant message profiles, social media contact information and phone numbers, billing information such as, for example, credit card, bank or PayPal™ account information and the like. Owners 102 will establish usernames such as an email address 206a and a password 206b such that unauthorized access to their personal information 206 is prevented. Upon completing creation of individual account 204, owner 102 can be directed to a sign-up confirmation page 207 confirming the account registration and listing options related to potential account services as shown in FIG. 4.

Figure 5:
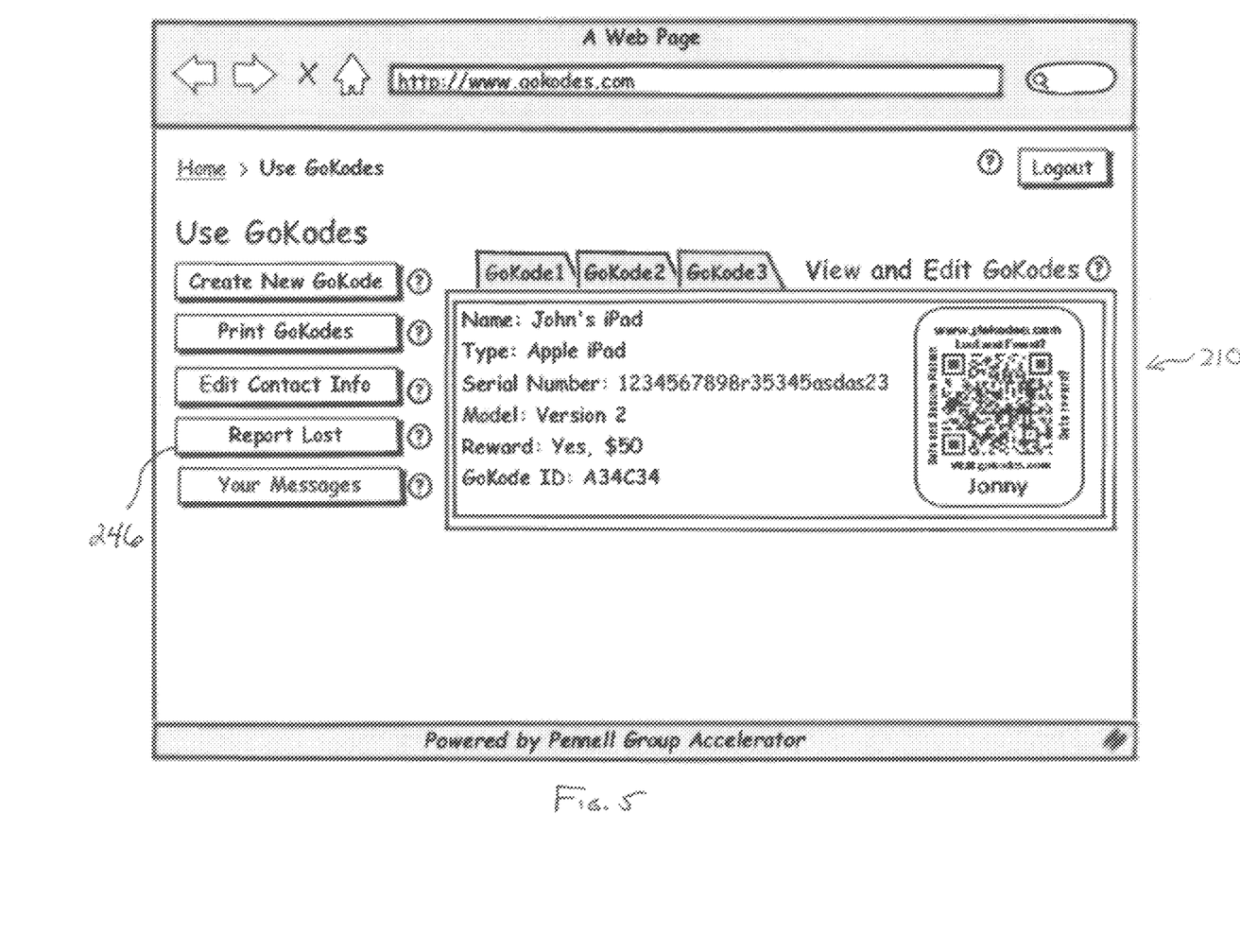
FIG. 5 is an illustration of a computer screenshot of a portable asset page interface for use with the system of FIG. 1.
Figure 6:
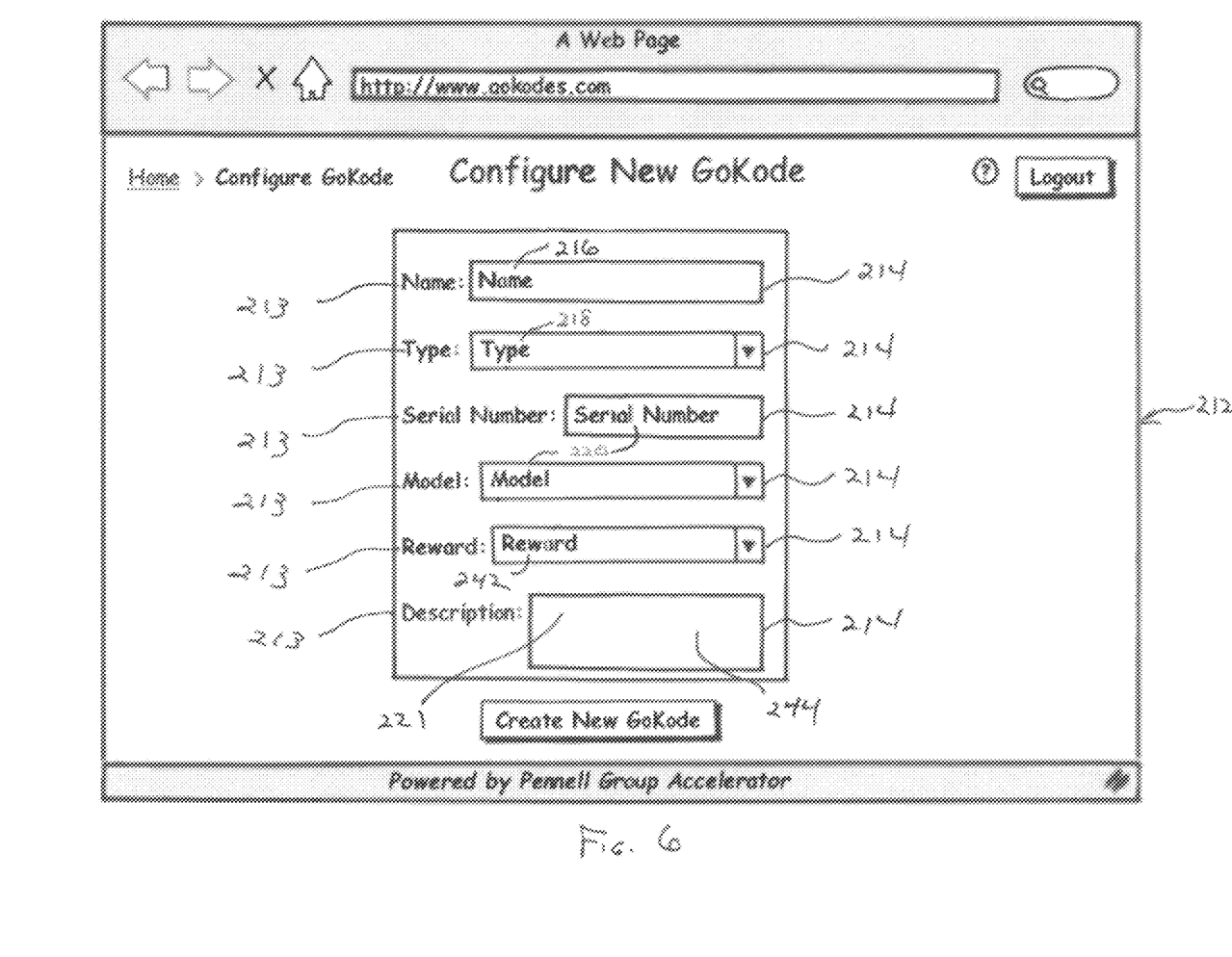
FIG. 6 is an illustration of a computer screenshot of a property registration page interface for use with the system of FIG. 1.
Figure 7:
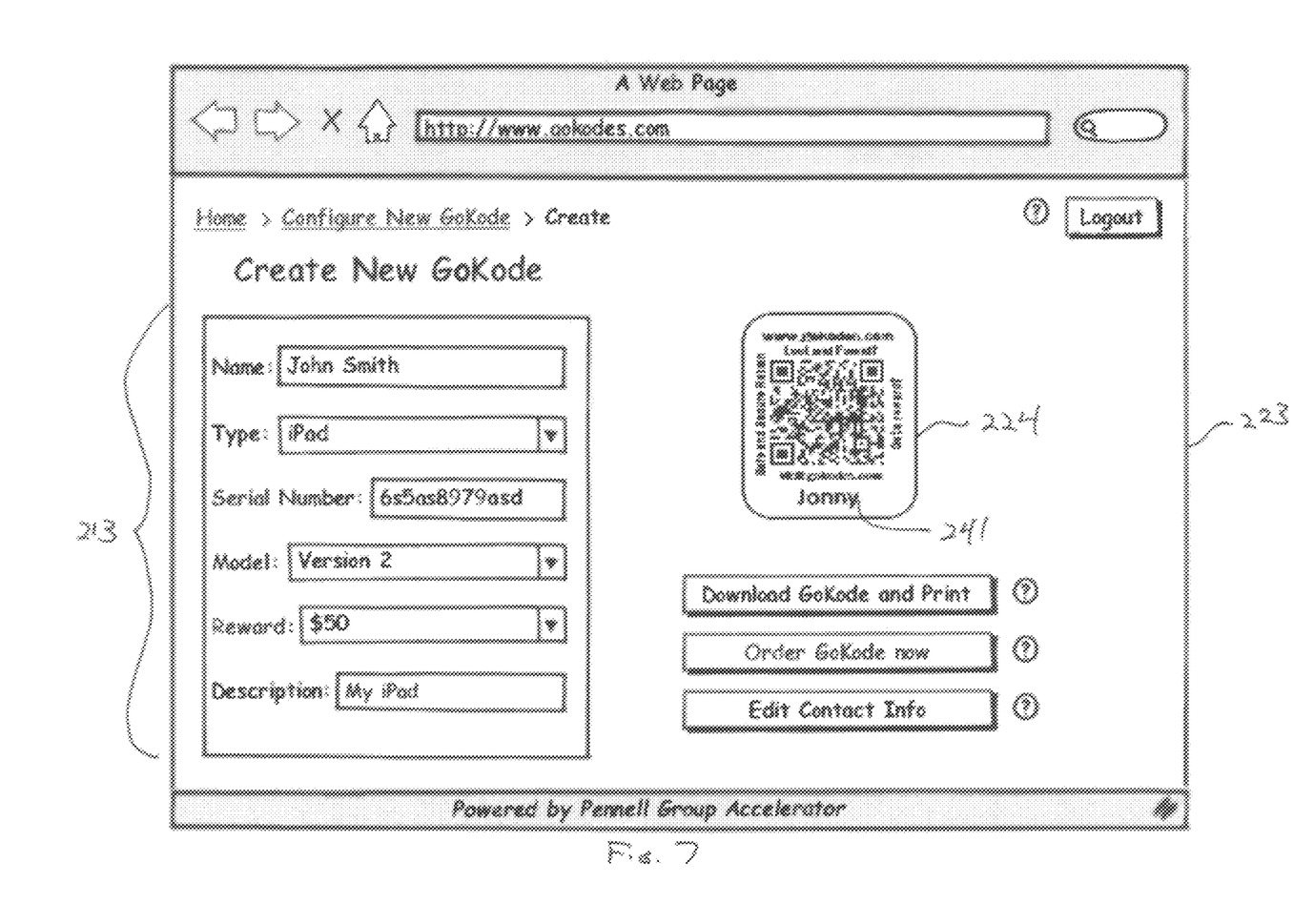
FIG. 7 is an illustration of a computer screenshot of a tag creation and delivery page interface for use with the system of FIG. 1.

Following the creation of the individual accounts 204, owner 102 can then interface with a personal property page 210 as illustrated in FIG. 5. Personal property page 210 allows owner 102 to access a number of different functions including the registration of new portable assets 60, printing functions, updating and editing information relating to existing portable assets 60, updating lost and found status of existing portable assets 60 and accessing messages to owner 102 that can be from the centralized vendor 100 or directly from the finder of lost portable assets 104. When owner 102 first accesses the personal property page 210, owner 102 will generally initiate registration of new portable assets 60 by interfacing with and completing a property registration page 212 as shown in FIG. 6. At property registration page 212, owner 102 will input property information 213 into a series of registration fields 214 that include information such as property name 216, property type 218 (cellphone, laptop or tablet computer, gaming device, music device, GPS/mapping device, briefcase, backpack, purse, walletet, key ring, etc. . . . ), identifying or distinguishing characteristics 220 (serial number, model number, color, material, etc.) or other descriptive information 221. Property information 213 is uploaded into the vendor database 208, whereby the property information 213 is associated with individual account 204. At that point, a vendor computer processor 222 creates a unique barcode 224, for example, a QR barcode, as shown in FIG. 7 that is specifically associated with the individual portable asset 60 that corresponds to property information 213. Unique barcode 224 generally will include embedded information including a link to a unique internet page associated with portable asset 60.

Figure 8:
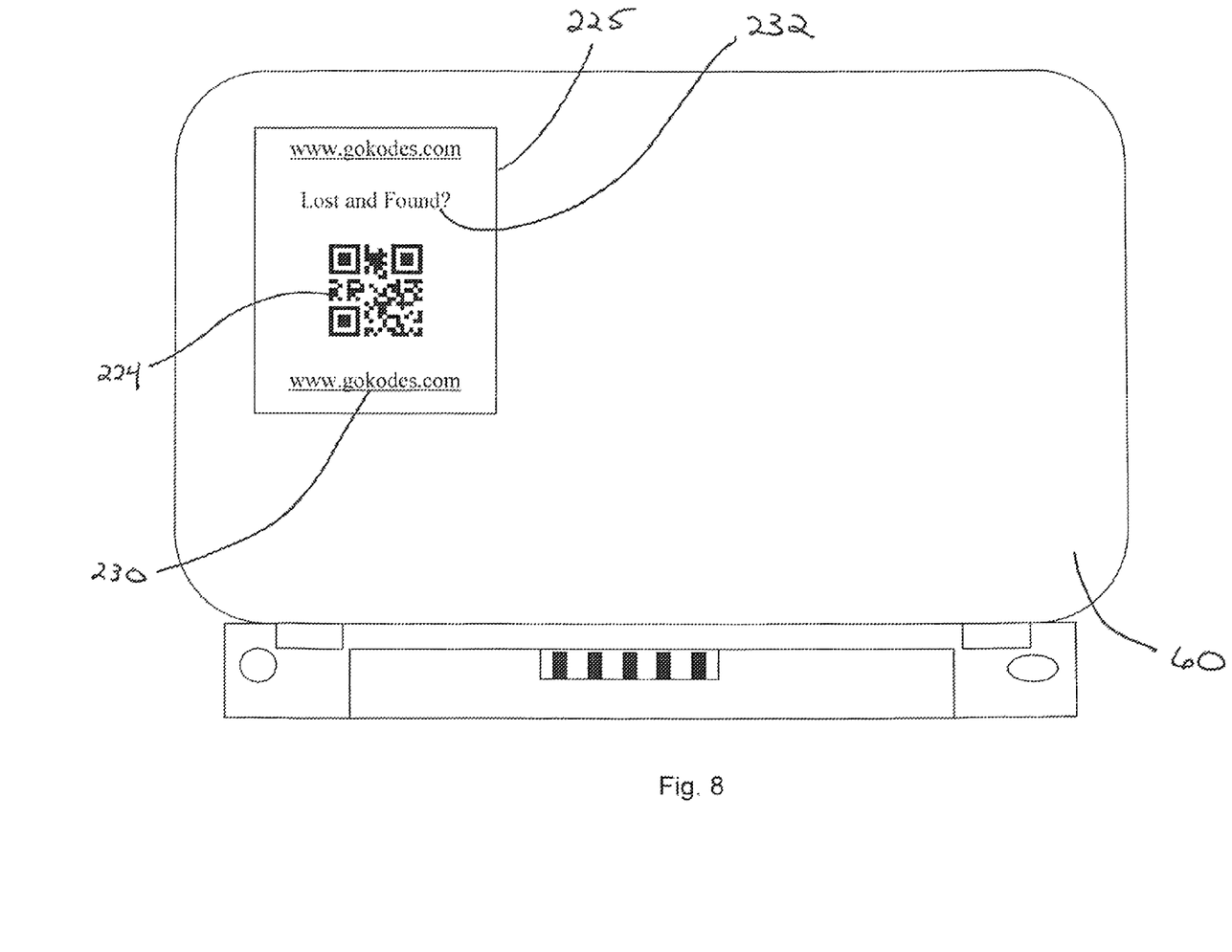
FIG. 8 is a rear view of a portable asset including a tag generated by instructions provided to the tag delivery page of FIG. 7.
Figure 9:
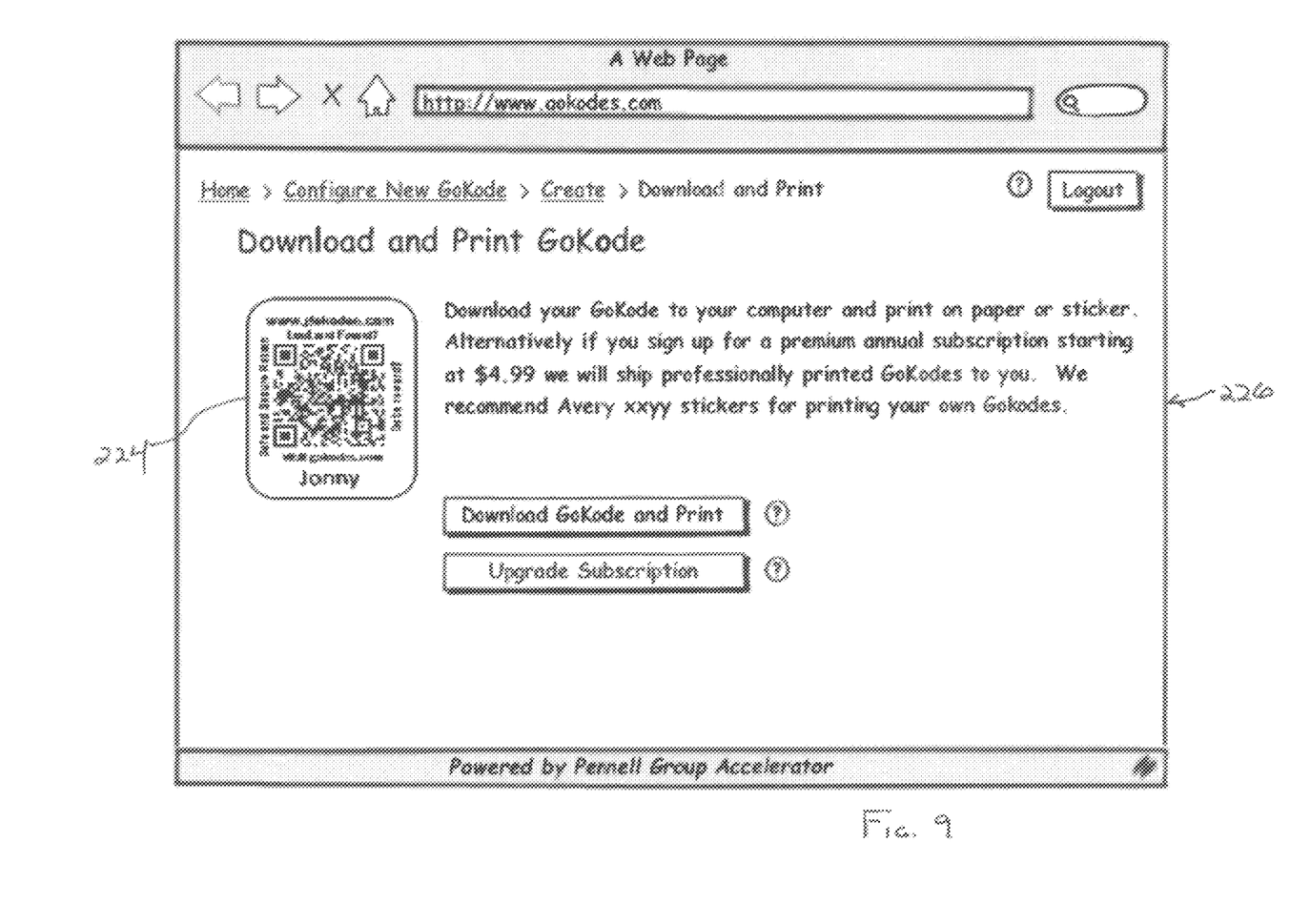
FIG. 9 is an illustration of a computer screenshot of a print interface page interface for use with the system of FIG. 1.

Once the barcode 224 is created, centralized vendor 100 requests owner 102 to select a method for delivery of a tag 225 to the owner 102 as shown in a tag creation and delivery page 223 as illustrated in FIG. 7. Options for delivery can include ordering and delivering a physical tag 225 as illustrated in FIG. 8 that includes the printed barcode 224 for attachment to the portable asset 60. Alternatively, owner 102 can request digital delivery of the tag 225 using email or through a direct printing function on print interface page 226 as shown in FIG. 9. If tag 225 is delivered through email or by directly printing the tag 225 from the print interface page 226, owner 102 will need to facilitate attachment of the tag 225 to the portable asset 60 for example, by laminating and creating their own physical tag 225 or by adhering tag 225 to the portable asset 60 as a sticker, key ring or other suitable attachment method. Regardless of whether the tag 225 is delivered physically or through electronic means, tag 225 will include the unique barcode 224 as well as a brand indicia 230. Brand indicia 230 will preferably comprise an easily recognizable symbol, word or color that will instantly communicate the significance of the tag 225 to the finder of portable asset 104. In addition to the barcode 224 and brand indicia 230, tag 225 can include additional text 232 such as, for example, instructions telling the finder of portable asset 104 to access the web page interface 202 for further instructions.

The process of registering portable assets 60, associating the barcode 224 to the individual item of personal property 60 and delivering the tag 225 can be repeated for each portable asset 60 that the owner 102 wishes to register. For instance, unique barcodes 224 can be generated for the owner's cell phone, laptop and tablet computer, gaming device, GPS/mapping device, backpack, briefcase, purse, wallet, keys, etc. . . . . Each portable asset 60 registered by owner 102 can be displayed on personal property page 210, such that the owner 102 has easy access and can quickly update status, remove items or add new portable assets 60.

Figure 10:
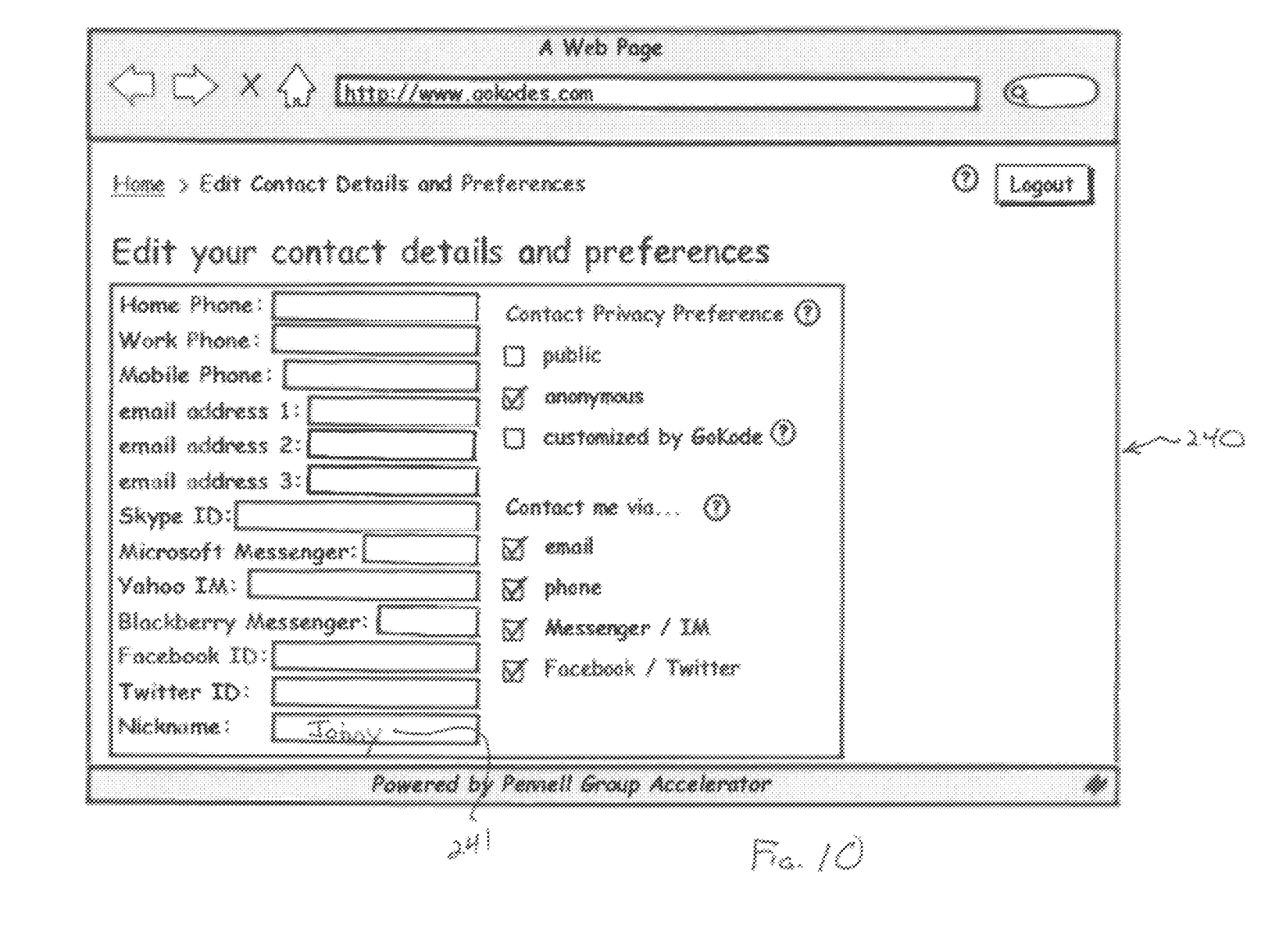
FIG. 10 is an illustration of a computer screenshot of a contract details and privacy preference page interface for use with the system of FIG. 1.

Once owner 102 has registered portable asset 60, owner 102 can access a contract details and privacy preference page 240 as shown in FIG. 10 that allows owner 102 to select the type and amount of communication that owner 102 is comfortable sharing with finder 104 with should portable asset 60 go missing. For instance, owner 102 may not have significant privacy concerns and as such, can elect to provide personal contact information such as, for example, telephone numbers, email addresses, twitter address, physical mailing addresses or social media information to finder 104. Alternatively, owner 102 may be supremely concerned about privacy and instead elect to provide for contact through anonymous communications such as by allowing email, text messaging or phone communications through the centralized vendor 100 whereby the owner's personal contact information such as, for example, owner's personal email address or phone number is never communicated. In addition, owner 102 can elect to have third party delivery services such as, United Parcel Service, Federal Express, U.S. Postal Service and the like, arrange for pick-up of lost portable assets 60 such that the finder 104 never becomes aware of the owner's identity or personal contact information. Owner 102 can elect to set up a global privacy setting applying to all registered portable assets 60 or can elect to utilize different privacy settings for each portable asset 60. For example, owner 102 can elect to allow more information to be communicated with respect to an item deemed less critical such as a gaming device or GPS/mapping device while an item containing sensitive information such as a smart phone or laptop/tablet computer may be accorded additional privacy limitations. In addition, contract details and privacy preference page 240 can allow owner 102 can assign a nickname 241 to each portable asset 60, wherein the nickname 241 is closely associated to the owner 102. Nickname 241 can be printed on tag 225 as shown in FIG. 7 such that persons who are familiar with owner 102 will be instantly familiar with who the portable asset 60 belongs to. Nickname 241 can also be used by owner 102 to distinguish between multiple items of registered personal property 60. Finally, nickname 241 can comprise additional symbols or figures in conjunction with or replacing text so as to provide additional meaning to nickname 241.

In order to facilitate the return of portable asset 60, owner 102 can elect to provide indication of a reward 242 or specific reward information 244 on the property registration page 212. Owner 102 can elect to provide this information during the initial registration of the portable asset 60 or at a time subsequent, for example, when owner 102 discovers that the portable asset 60 has been lost or is otherwise missing. In addition, owner 102 upon the determination that portable asset 60 has been lost or is otherwise missing can return to the personal property page 210 and toggle a property status 246 to "missing" or "lost". Adjusting the property status 246 can trigger the display of reward 242 or specific reward information 244 for the missing portable asset 60.

Figure 11:
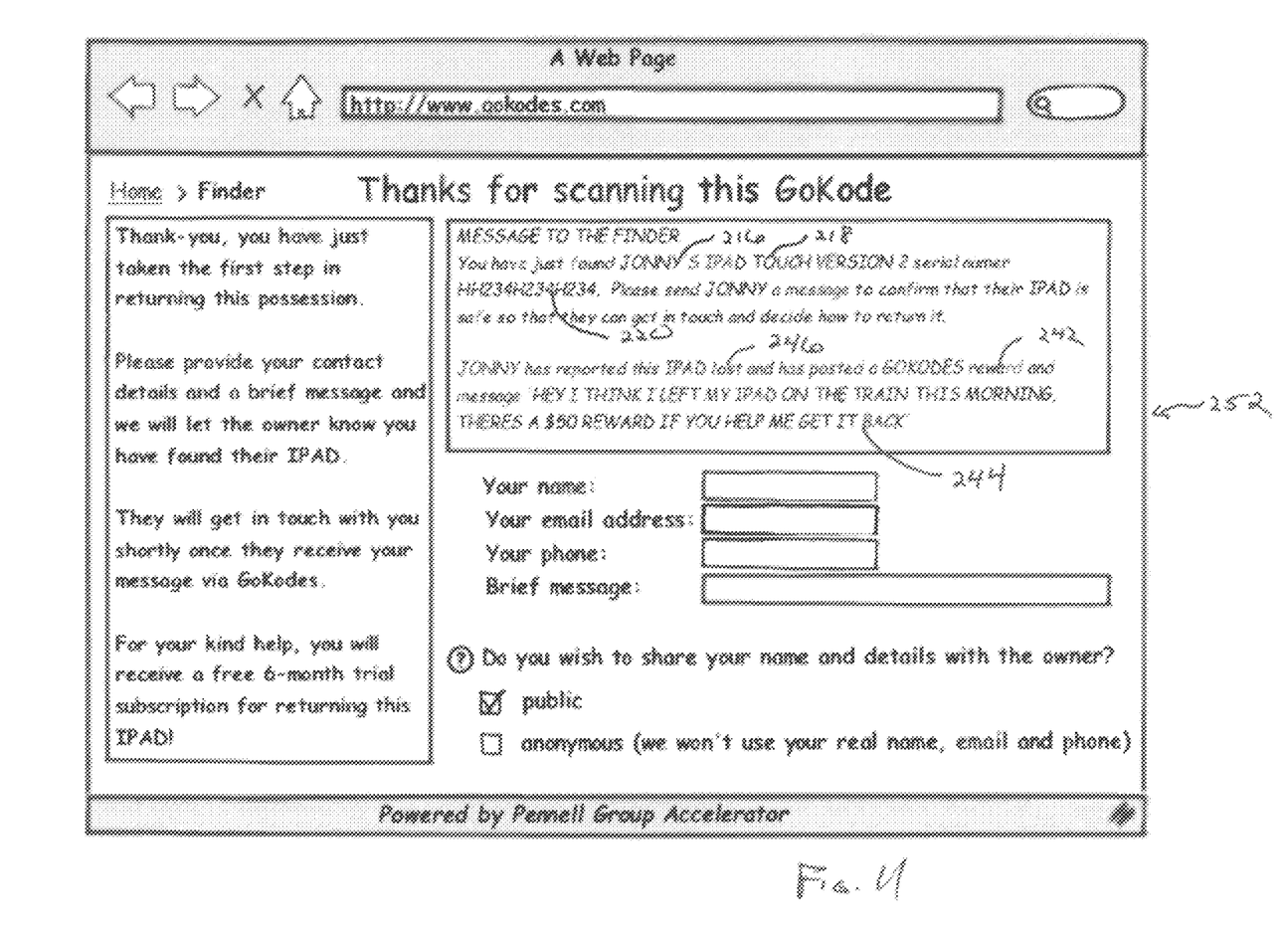
FIG. 11 is an illustration of a computer screenshot of a unique property page interface for use with the system of FIG. 1.

In the event that the portable asset 60 has become lost or is otherwise missing, tag 225 will be readily viewable on the portable asset 60. When finder 104 discovers the portable asset 60, tag 225 either through the recognition of barcode 224, brand indicia 230 and/or text 232 will provide an instant indication to finder 104 that they have come across a registered portable asset 60. Based upon their familiarity with the tag 225, or the information conveyed by tag 225, i.e. brand indicia 230 and/or text 232, finder 104 will utilize or be instructed to utilize a camera equipped device 250 to snap a picture of the barcode 224. Camera equipped device 250 can comprise any one of a variety of suitable smart devices including "smart" phones, laptop or tablet computers, music devices, gaming devices and electronic readers that are capable of communicating with the internet. Using any of a variety of freely available software/applications, camera equipped device 250 will access the information embedded within the barcode 224, i.e. an internet link to a unique webpage and be directed to a unique property page 252 created by the centralized vendor 100 and embedded within the barcode 224 as a machine readable web address as shown in FIG. 11. Unique property page 252 can include information pulled from the personal property page 210 such as, for example, property name 216, property type 218 and identifying or distinguishing characteristics 220. In addition, unique property page 252 can include information relating to reward 242 or specific reward information 244 as well as property status 246. In addition, the contact/return information based on the owner's privacy concerns can be displayed such that facilitation of the return of portable asset 60 can be accomplished. Depending upon the type of camera equipped device 250, certain location information can be communicated from the camera equipped device 250 to the centralized vendor 100. This location information can include GPS coordinates indicating where the camera equipped device 250 is physically located as well as IP address information related to the camera equipped device 250.

Figure 12:
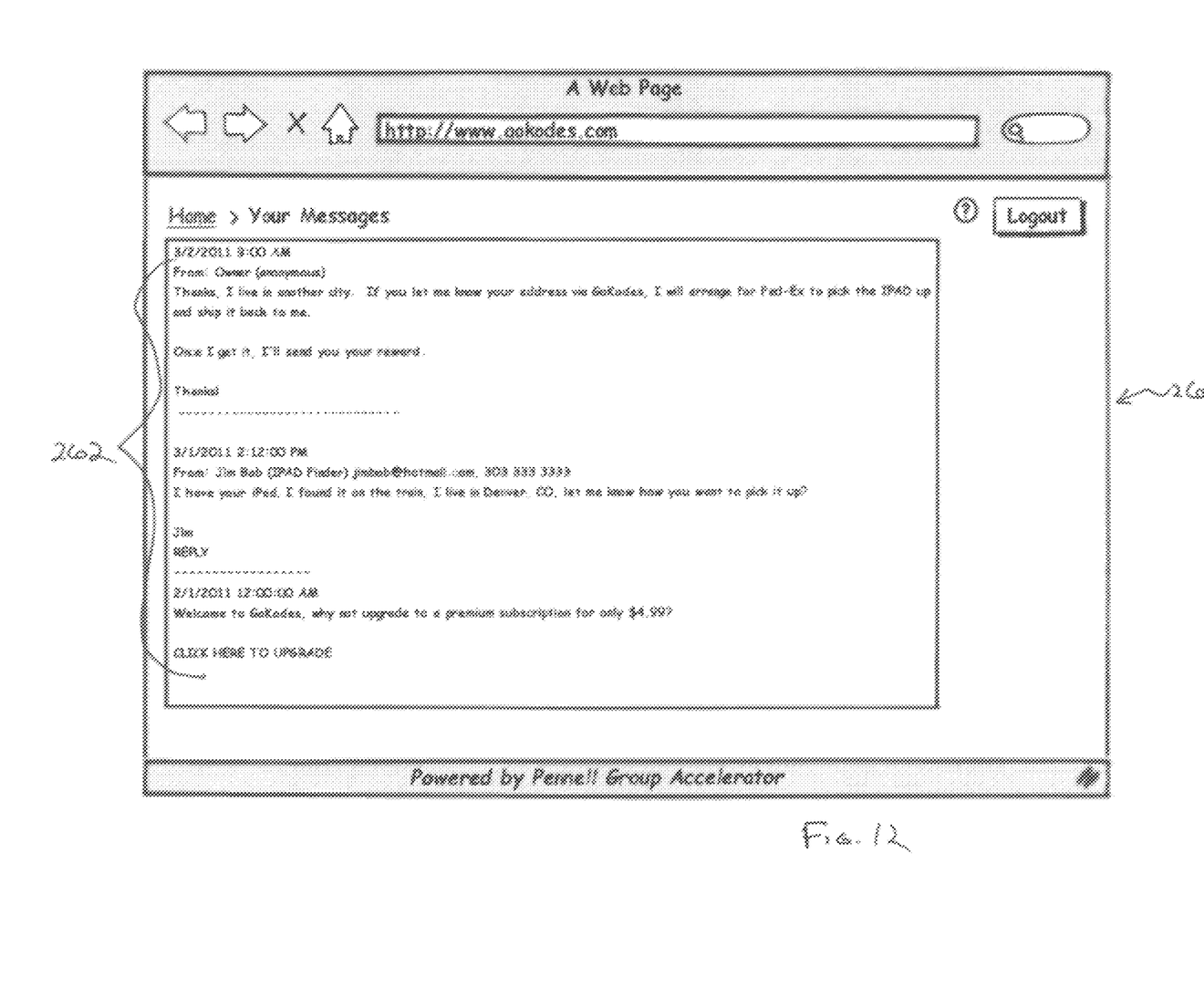
FIG. 12 is an illustration of a computer screenshot of an owner messaging page interface for use with the system of FIG. 1.

Based on the communication settings established by owner 102 on the contract details and privacy preference page 240, contact initiated by finder 104 on the unique property page 252 can be directed to an owner messaging page 260 that is provided by the centralized vendor 100 as shown in FIG. 12. Using owner messaging page 260, email communication 262 or alternatively, text messaging can be quickly established between the owner 102 and finder 104 with the owner 102 being able to maintain their desired level of confidentiality with respect to personal information 213. In addition, owner messaging page 260 can provide a forum for communication between the centralized vendor 100 and owner 102.

Utilizing system 50 of the present invention, owners 102 and finders 104 of portable assets 60 can be quickly connected via centralized vendor 100. Using the intermediary nature of centralized vendor 100, owner 102 can be in control of the amount and type of information supplied to finder 104 during the return process. In some instances, owner 102 can remain completely anonymous by utilizing the communication functions of centralized vendor 100 and through the use of third party delivery vendors to pick-up and deliver portable asset 60. Alternatively, centralized vendor 100 can provide information allowing a finder 104 to almost instantly contact the owner 102 via specific personal contact information that is displayed when finder 104 accesses the embedded information contained within barcode 224. System 50 provides customized privacy and anonymity settings for each portable asset that owner 102 has registered with centralized vendor 100.

The foregoing descriptions present numerous specific details that provide a thorough understanding of various embodiments of the invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments can be constructed that nevertheless employ the principles and spirit of the present invention. Accordingly, this application is intended to cover any adaptations or variations of the invention. It is manifestly intended that this invention be limited only by the following claims and equivalents thereof.

The invention claimed is:

1. A method for facilitating the return of a portable asset, comprising:
   providing a host processor including a memory module;
   receiving input from a property owner so as to define a user account associated with the property owner, said user account stored within the memory module;
   registering at least one individual portable asset such that property information unique to each individual portable asset is associated with the user account;
   creating a return profile for each individual portable asset that includes privacy preferences elected by the property owner, the return profile including a owner nickname for each individual portable asset that is recognizable by persons familiar with the property owner, the return profile and privacy preferences being used to create a unique property page uniquely identified with each individual portable asset;
   generating a tag that displays both the owner nickname and a visual code with the host processor wherein both the nickname and visual code are unique to the individual portable asset and associated with the user account, the visual code including embedded information that links directly to the unique property page;
   delivering the tag to the property owner for attachment to the individual portable asset; and
   directly accessing the unique property page when a finder of the portable asset accesses the embedded information of the visual code by photographing the visual code with a smart device, and wherein a communication protocol previously dictated by the privacy preferences contained within the return profile associated with the portable asset is established without any additional input from the finder of the portable asset.

2. The method of claim 1, wherein the visual code comprises a barcode.

3. The method of claim 1, wherein the step of establishing a communication protocol, further comprises:
   acting as an intermediate to maintain anonymity for one or both of the property owner and the finder of the portable asset.

4. The method of claim 1, wherein the step of delivering the tag to the property owner, further comprises:
   sending a printable tag to the property owner electronically via an email or text message.

5. The method of claim 1, wherein the step of delivering the to the property owner, further comprises:
   sending a physical tag to the property owner.

6. The method of claim 1, further comprising:
   communicating location specific information transmitted by the smart device to the property owner, said location specific information being supplied as the smart device accesses the visual code.

7. The method of claim 6, wherein the location specific information includes GPS information and IP addresses linked to the smart device.

8. The method of claim 1, further comprising:
   facilitating the return of the portable asset from the finder of the portable asset to the property owner via a third party delivery service.

9. A method for facilitating the return of a portable asset, comprising:
   registering an individual user account with a centralized processor, the individual user account including at least one return profile related to an individual portable asset, wherein each return profile includes an owner nickname and privacy preferences that are elected by a property owner, the owner nickname selected to be recognizable by persons familiar with the property owner, wherein the owner nickname and privacy preferences are associated with the individual portable asset, said return profile and privacy preferences being used to create a unique property page that is uniquely identified with the individual portable asset;
   receiving a tag displaying both the owner nickname and a visual code from the centralized processor, said visual code including embedded information directly linking, through the internet, a processor of a smart device to the unique property page when a finder snaps a picture of the visual code with the smart device; and
   attaching the tag to the individual portable asset.

10. The method of claim 9, wherein registering the individual user account with the centralized processor, further comprising:
    selecting within the privacy preferences a privacy level which dictates an amount of personal information to display from the return profile when the return profile is accessed by the embedded information in the visual code.

11. The method of claim 9, further comprising:
    updating the individual user account so as to indicate a property status for the individual portable asset on the at least one return profile.

12. The method of claim 9, further comprising:
    choosing a reward incentive to display with the return profile.

13. The method of claim 9, further comprising:
    choosing a communication protocol by which a finder of lost property can contact an owner of the individual user account.

14. A method for identifying an owner of a lost portable asset, comprising:
  photographing a visual tag on a portable asset with a camera device, wherein the camera device includes a processor communicating with the interne such that the processor reads embedded information in the visual tag and directly links the camera device to a unique property page that is uniquely associated with the portable asset, wherein the unique property page is created using information from a return profile and privacy preferences as established by an owner of the portable asset; and
  initiating contact with the owner of the portable asset as the unique property page is directly accessed by the smart device.

15. The method of claim 14, further comprising:
  returning the portable asset via a third party delivery service wherein an identity of the owner of the portable asset remains anonymous.

16. The method of claim 14, wherein contacting the owner of the portable asset, further comprises:
  using personal contact information as displayed on the unique property page to contact the owner of the portable asset.

17. The method of claim 14, wherein contacting the owner of the portable asset, further comprises:
  using anonymous contact information displayed on the unique property page to contact the owner of the portable asset.

18. The method of claim 14, further comprising:
  providing information from the camera device to the processor, said information including GPS location or IP address information.

19. A portable asset recovery system, comprising:
  a host processor including a memory module hosting a database of individual user accounts, each individual user account including at least one return profile associated with an individual portable asset, wherein each return profile includes privacy preferences elected by a user, the return profile and privacy preferences being used to create a unique property page that is uniquely associated with the individual portable asset; and
  a visual tag including a symbol containing embedded information, the embedded information including a machine readable internet link to the unique property page, the symbol being accessible to capture by a camera device while the visual tag is resiliently attached to the individual portable asset, and wherein the camera device directly accesses and displays the unique property page.

20. The property recovery system of claim 19, wherein the visual tag comprises a printed sticker attached directly to the individual portable asset.

21. The property recovery system of claim 19, further comprising:
  a third party vendor for facilitating the return of the individual portable asset from a finder of the lost portable asset to an owner of the lost portable asset.

22. The property recovery system of claim 19, wherein the host processor generates a user interface whereby an owner of the individual portable asset can create the individual user account.

23. The property recovery system of claim 22, wherein the user interface allows the owner of the individual portable asset to update the at least one return profile.

24. The property recovery system of claim 19, wherein the return profile indicates a property status of the individual portable asset.

25. The property recovery system of claim 19, wherein the return profile indicates reward information associated with return of the individual portable asset.

26. The property recovery system of claim 19, wherein the privacy preferences within the return profile includes a privacy level dictating an amount of information elected by the owner for display from the return profile to the finder.

* * * * *

UNITED STATES PATENT AND TRADEMARK OFFICE
CERTIFICATE OF CORRECTION

| | | |
|---|---|---|
| PATENT NO. | : 8,973,813 B2 | Page 1 of 1 |
| APPLICATION NO. | : 13/449882 | |
| DATED | : March 10, 2015 | |
| INVENTOR(S) | : Penny et al. | |

It is certified that error appears in the above-identified patent and that said Letters Patent is hereby corrected as shown below:

In the Claims

Column 9, Line 5, Claim 14:

Delete "interne" and insert -- internet --.

Signed and Sealed this
Thirtieth Day of June, 2015

Michelle K. Lee
*Director of the United States Patent and Trademark Office*